(12) United States Patent
Park et al.

(10) Patent No.: US 7,182,414 B2
(45) Date of Patent: Feb. 27, 2007

(54) UNDERCARRIAGE EQUIPPED WITH NON-STEEL TYPE RUBBER CRAWLER USING CHAIN ACTION

(75) Inventors: Dong-hwa Park, Gyeonggi-do (KR); Joon-il Cho, Seoul (KR)

(73) Assignee: Dong-Il Rubber Belt Co., Ltd., Busan (KR)

( * ) Notice: Subject to any disclaimer, the term of this patent is extended or adjusted under 35 U.S.C. 154(b) by 0 days.

(21) Appl. No.: 11/192,841

(22) Filed: Jul. 29, 2005

(65) Prior Publication Data

US 2006/0082218 A1 Apr. 20, 2006

(30) Foreign Application Priority Data

Oct. 14, 2004 (KR) ............... 10-2004-82181

(51) Int. Cl.
*B62D 55/18* (2006.01)

(52) U.S. Cl. ............... 305/33; 305/139; 305/184

(58) Field of Classification Search ............... 305/33, 305/124, 139, 184, 60
See application file for complete search history.

(56) References Cited

U.S. PATENT DOCUMENTS 2,453,209 A * 11/1948 Dwight ............... 305/33
2,541,177 A * 2/1951 Slemmons ............... 305/33
2,592,542 A * 4/1952 Curtis ............... 305/178
3,459,459 A * 8/1969 Eilers ............... 305/33
4,221,272 A * 9/1980 Kell ............... 180/190
6,062,327 A * 5/2000 Ketting et al. ............... 180/9.52
7,036,894 B1 * 5/2006 Woodall et al. ............... 305/185

FOREIGN PATENT DOCUMENTS

KR 2002-0026894 5/2002

* cited by examiner

*Primary Examiner*—Russell D. Stormer
(74) *Attorney, Agent, or Firm*—Swanson & Bratschun, LLC

(57) ABSTRACT

The present invention relates to an undercarriage equipped with a coreless rubber crawler in a chain drive configuration, and more particularly, to a track system undercarriage for a skid loader in which an auxiliary axle and an auxiliary sprocket are provided to solve the problem of load concentration at the contact points of a coreless rubber crawler, which is adopted to reduce the total load of a vehicle. A gear chain is provided surrounding a main axle and the auxiliary axle, so that the load is dispersed over a large contact area of the coreless rubber crawler, thereby relieving internal stress concentrations at the sprocket and the coreless rubber crawler, and significantly improving the life span of the coreless rubber crawler.

4 Claims, 5 Drawing Sheets

UNDERCARRIAGE EQUIPPED WITH NON-STEEL TYPE RUBBER CRAWLER USING CHAIN ACTION

RELATED APPLICATION

This application claims priority to Korean Patent Application No. 10-2004-82181, filed Oct. 14, 2004, which is incorporated herein by reference in its entirety.

TECHNICAL FIELD

The present invention relates to an undercarriage equipped with a coreless rubber crawler in a chain drive configuration, and more particularly, to a track system undercarriage for a skid loader in which an auxiliary axle and an auxiliary sprocket are provided to solve the problem of load concentration at the contact points of a coreless rubber crawler, which is adopted to reduce the total load of a vehicle, and the cogs of a sprocket. A gear chain is provided surrounding a main axle and the auxiliary axle so that the load is dispersed over a large area of the coreless rubber crawler, thereby relieving internal stress concentrations at the sprocket and the coreless rubber crawler and significantly improving the life span of the coreless rubber crawler.

BACKGROUND ART

In general, heavy vehicles such as skid loaders, excavators, bulldozers, etc. have undercarriage that supports the vehicle and allows it to move to a desired position.

Typically, a crawler is used in the undercarriage for efficient transportation of a heavy vehicle on rough or unstable ground. Recently, a rubber crawler has been widely used to reduce vibration and noise during transportation and to minimize road damage.

Usually, the rubber crawler has a steel core inside the rubber track, and receives power from the transmission via a sprocket and an idler. But, with regard to an improvement in the flexibility of the rubber crawler and a reduction in vehicle weight, a coreless rubber crawler without a steel core is proposed.

FIG. 1 and FIG. 2 are front views of an undercarriage having such a coreless rubber crawler, with and without the crawler, respectively.

As seen in FIG. 1 and FIG. 2, the undercarriage is equipped with a coreless rubber crawler 10, a sprocket 20 for driving the rubber crawler 10, a track roller 50 located inside the coreless rubber crawler 10, and an idler 60.

The coreless rubber crawler 10 comprises a belt body having a closed-loop shape, pull lugs 11 formed on the outer surface of the belt body, and protruding teeth 12 formed on the inner surface of the belt body. The sprocket 20, which receives a rotational driving force from a main axle 40, has protruding cogs 21 on its outer circumference. As the cogs 21 are geared with the protruding teeth 12 on the inside of the coreless rubber crawler 10, the rotational driving force is transferred to the coreless rubber crawler 10 so that it moves forwards or backwards. The coreless rubber crawler 10 rotates with the track roller 50, located at the bottom of the coreless rubber crawler 10, and the idler 60 located at the rear, moving forwards or backwards and distributing the weight of the vehicle uniformly to the ground surface.

In such an undercarriage, the parts that bear the highest load are the cogs 21 where the sprocket 20 is geared with the coreless rubber crawler 10, and the point where the coreless rubber crawler 10 contacts the ground.

Some dynamic analysis research has been done on the point where the coreless rubber crawler 10 contacts the ground to determine the distribution of internal stresses thereabout. For example, Korean Patent Application No. 2002-0026894 (Rubber crawler and rubber crawler driving apparatus) reduces the difference in rigidity of a less rigid first lug part and a more rigid second lug part by lessening the thickness of the second lug along the belt body direction so it is smaller than that of the first lug part. As a result, deformation of the crawler is reduced, thereby reducing vibration and improving riding comfort.

On the other hand, there has been no dynamic analysis research at the cogs 21 where the sprocket 20 is geared with the coreless rubber crawler 10 (A–A' in FIG. 1) to determine the distribution of the internal stresses thereabout.

Although there is the advantage of an improvement in the bending ability of the rubber crawler and a reduction of vehicle weight when a coreless rubber crawler 10 is used for the undercarriage, the coreless rubber crawler is difficult to equip and stress tends to be concentrated at specific points (see FIG. 3) because of the relatively small area at which the rubber crawler contacts the sprocket, which causes stress-induced deformation, leading to a reduction in life span and durability.

Accordingly, it is necessary to relieve stress at the contact points of the coreless rubber crawler and the sprocket in heavy vehicles like skid loaders, as friction between the vehicle and the ground is transferred to the rubber crawler, thereby reducing stress-induced deformation and improving the life span and durability.

SUMMARY OF THE INVENTION

It is an object of the present invention to relieve stress at the contact points of a coreless rubber crawler, which is adopted in the undercarriage of a heavy vehicle like a skid loader to reduce vehicle weight, and a sprocket, thereby reducing stress-induced deformation of the rubber crawler and improving the life span and durability.

It is another object of the present invention to offer a more efficient and stable transfer of a driving force between the sprocket and the coreless rubber crawler, thereby improving riding comfort.

Other objects of the present invention will be described in more detail hereinbelow.

An undercarriage equipped with a coreless rubber crawler in a chain drive configuration according to the present invention is characterized by comprising: a coreless rubber crawler; a gear chain, the outside of which is in contact with the inside of the coreless rubber crawler; a rotating sprocket having cogs, one of which is connected to each end of a main axle and the cogs are in contact with the inside of the gear chain; an idler rotated by the coreless rubber crawler; a track roller; and a rotatable auxiliary sprocket having cogs, one of which is connected to each end of an auxiliary axle spaced a predetermined distance from the main axle, and the cogs are in contact with the inside of the gear chain.

Preferably, the gear ratio of the sprocket and the auxiliary sprocket is set to 2:1 for efficient stress dispersion.

And, preferably, the undercarriage may further comprise at least one supporting axle between the main axle and the auxiliary axle and a supporting sprocket, having cogs that gear with the gear chain, at both ends of the supporting axle in order to prevent the gear chain from sagging because of the distance between the main axle and the auxiliary axle and the weight of the gear chain, and to prevent non-uniform contact of the gear chain with the coreless rubber crawler.

Preferably, the supporting axle and the supporting sprocket are located in between the main axle and the auxiliary axle. More supporting axles and supporting sprockets may be added when the distance between the main axle and the auxiliary axle is increased, to increase the contact area of the gear chain and the coreless rubber crawler.

| | |
|---|---|
| 10: coreless rubber crawler | |
| 11: lug | 12: protruding tooth |
| 20: sprocket | 21: cog |
| 30: auxiliary axle | 40: main axle |
| 50: track roller | 60: idler |
| 70: gear chain | 80: auxiliary sprocket |
| 90: supporting axle | 91: supporting sprocket |
| 100: undercarriage | |

DETAILED DESCRIPTION OF THE PREFERRED EMBODIMENT

Hereunder is given a detailed description of a preferred embodiment of the present invention referring to the attached drawings. In the description, known matters that are considered unnecessary in describing the invention will not be described in detail.

The terms were selected considering the roles in the present invention. The terms need to be defined based on the overall contents of this specification, since they may be used differently depending on users and practices.

Figure 4:
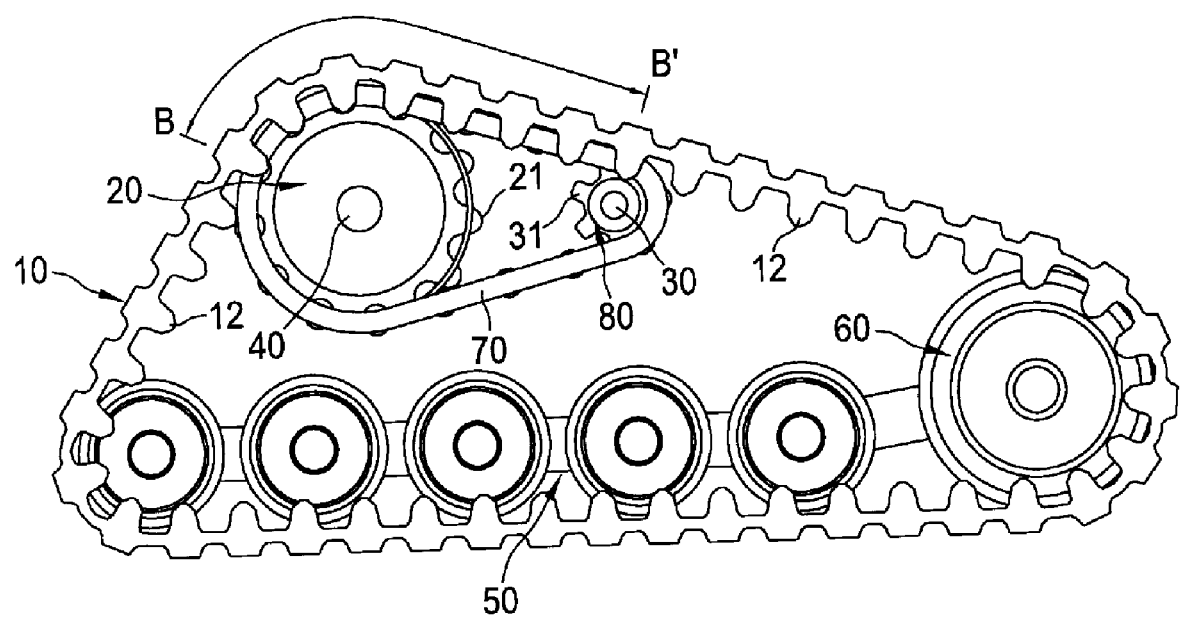
FIG. 4 is a side view of an undercarriage according to a preferred embodiment of the present invention.

FIG. 4 is a side view of undercarriage 100 according to a preferred embodiment of the present invention. It shows an auxiliary sprocket 80 and a gear chain 70 which are characteristic of the undercarriage 100 of the invention.

A description of a coreless rubber crawler 10 having protruding teeth 12 on the inside, a track roller 50 and an idler 60 will be omitted because they are the same as those of conventional undercarriage. An auxiliary axle 30, an auxiliary sprocket 80 and a gear chain 70, which are key constituents of the present invention, are shown in FIG. 4 and FIG. 5.

A sprocket 20 receives a rotational driving force from the main axle 40. It has cogs 21 spaced at a given interval on its outer circumference. The auxiliary axle 30 is spaced from the main axle 40 by a predetermined distance. Each end of the auxiliary axle 30 is connected with an auxiliary sprocket 80 and auxiliary cogs 31 are spaced at a given interval on the outer circumference of the auxiliary sprocket 80.

Figure 5:
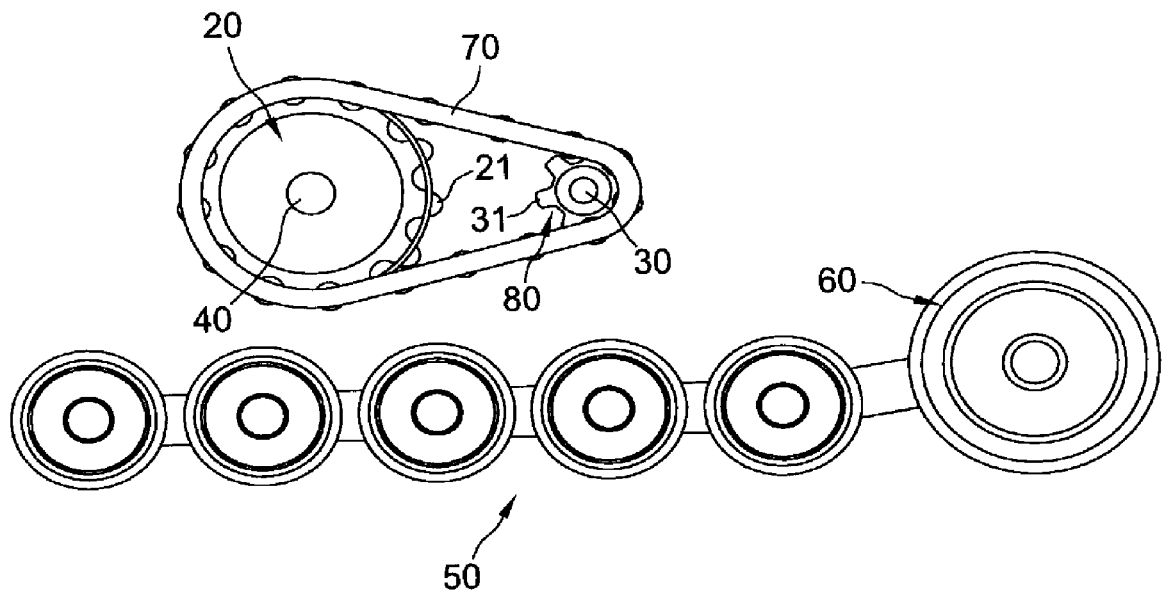
FIG. 5 is a side view of an undercarriage according to a preferred embodiment of the present invention in which the coreless rubber crawler is omitted.

In the embodiment of the present invention, the gear ratio, or the ratio of the number of cogs 21 of the sprocket 20 to the number of cogs 31 of the auxiliary sprocket 80, is 12:6, or 2:1, as seen in FIG. 4 and FIG. 5. That is, it is preferable that the gear ratio is 2:1. Otherwise, stress dispersion may be inefficient. The gear chain 70 forms a closed loop surrounding the sprocket 20, the auxiliary sprocket 80 and their cogs 21 and 31, respectively.

The gear chain 70 receives a rotational driving force from the cogs 21 of the sprocket 20, which receives a rotational driving force from the main axle 40. As the gear chain 70 rotates, so does the auxiliary sprocket 80 connected to the auxiliary axle 30.

The portion of the gear chain 70 between the cogs 21 and 31 of the sprocket 20 and the auxiliary sprocket 80 that are in contact with the gear chain, i.e., section B–B' in FIG. 4, is contacted by protruding teeth 12 of the coreless rubber crawler 10. At the section B–B', a rotational driving force is transferred from the gear chain 70 to the coreless rubber crawler 10.

Figure 1:
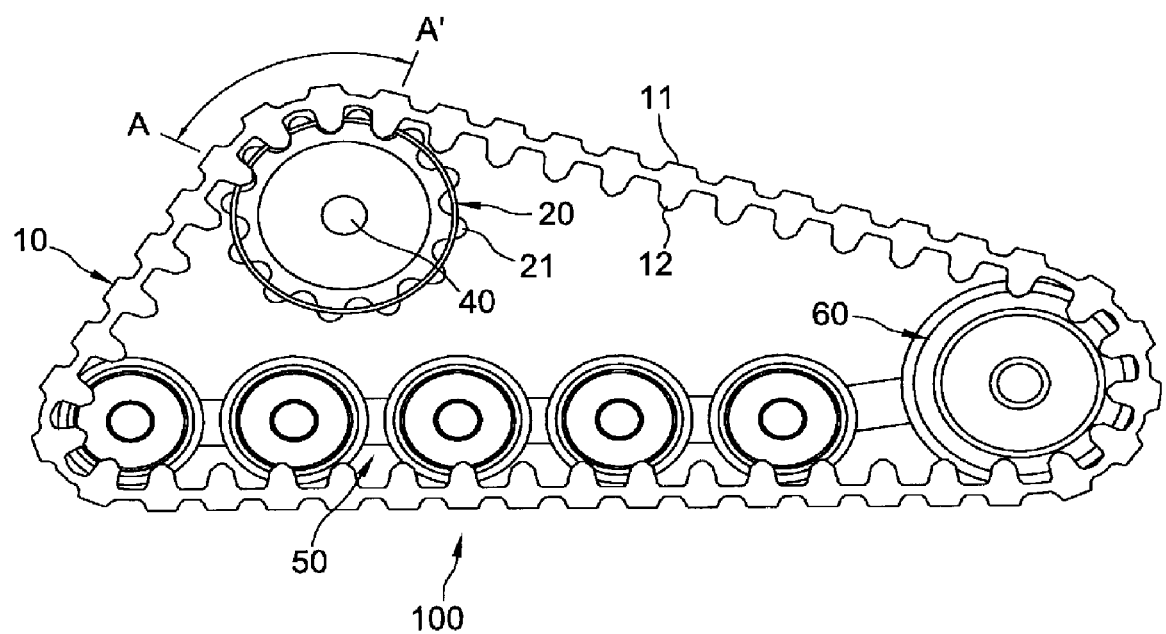
FIG. 1 is a side view of a conventional sprocket and rubber crawler arrangement.
Figure 2:
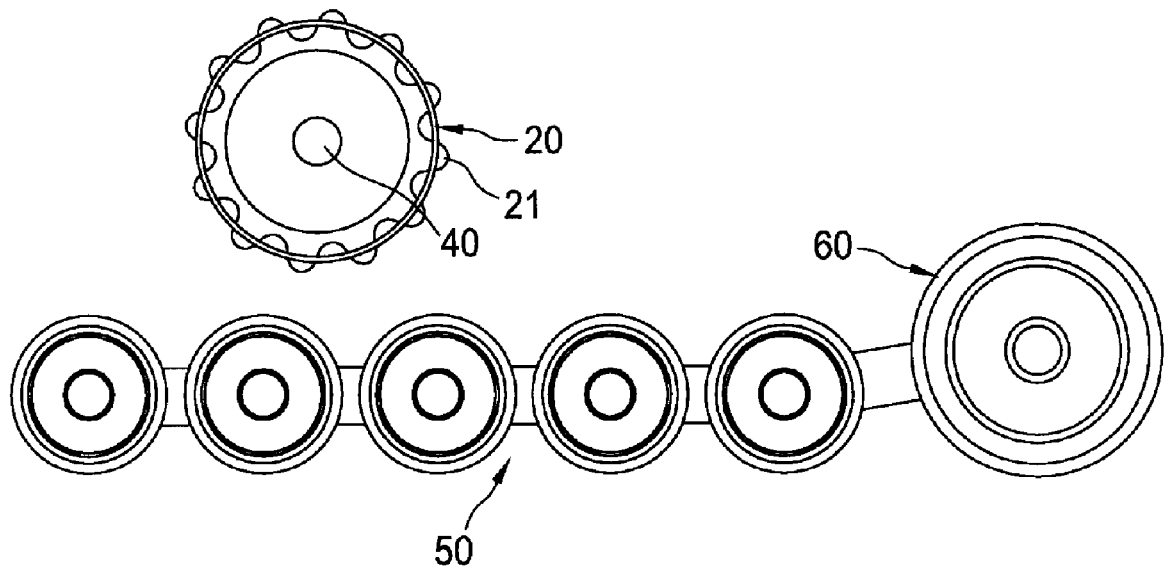
FIG. 2 is a side view of a conventional undercarriage in which the coreless rubber crawler is omitted.

While a rotational driving force is only transferred at a limited portion of the sprocket 20 (section A–A' of FIG. 1) in the conventional system, it is indirectly transferred over a larger area (section B–B' of FIG. 4) in the preferred embodiment of the present invention, thereby uniformly distributing the load from above and relieving internal stress concentrations.

Figure 6:
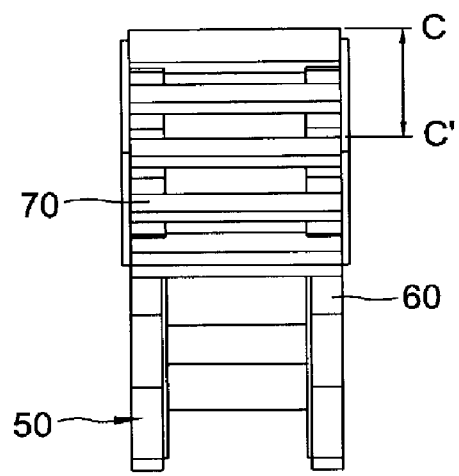
FIG. 6 is a front view of an undercarriage according to a preferred embodiment of the present invention.
Figure 7:
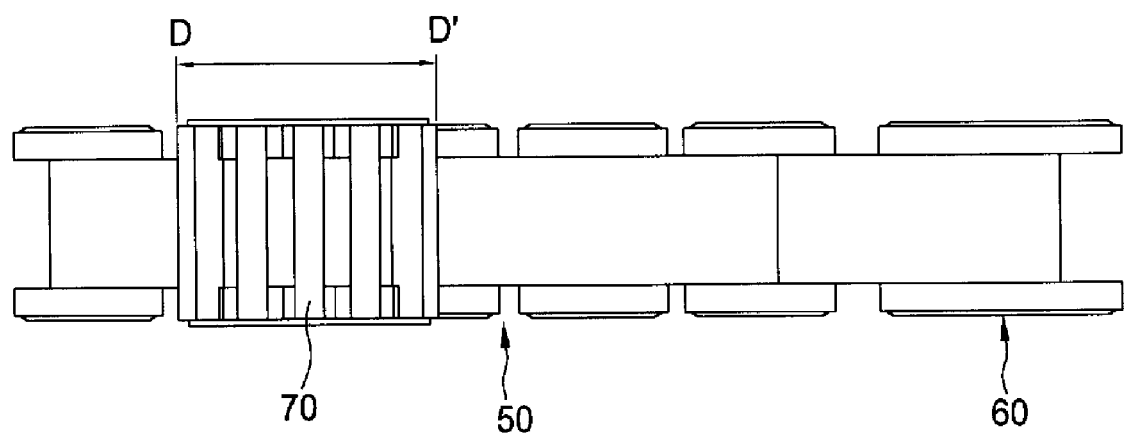
FIG. 7 is a plan view of an undercarriage according to a preferred embodiment of the present invention.

FIG. 6 and FIG. 7 are front and plan views of the undercarriage 100 according to the preferred embodiment of the present invention. It can be seen that the undercarriage 100 has a larger contact area than a conventional undercarriage.

Section B–B' of FIG. 4 corresponds to section C–C' of FIG. 6 and section D–D' of FIG. 7. The farther the auxiliary axle 30 is from the main axle 40, parallel to the top portion of the coreless rubber crawler 10, the larger the area where the gear chain 70 contacts the coreless rubber crawler 10, thereby being capable of relieving a higher stress concentration.

Figure 3:
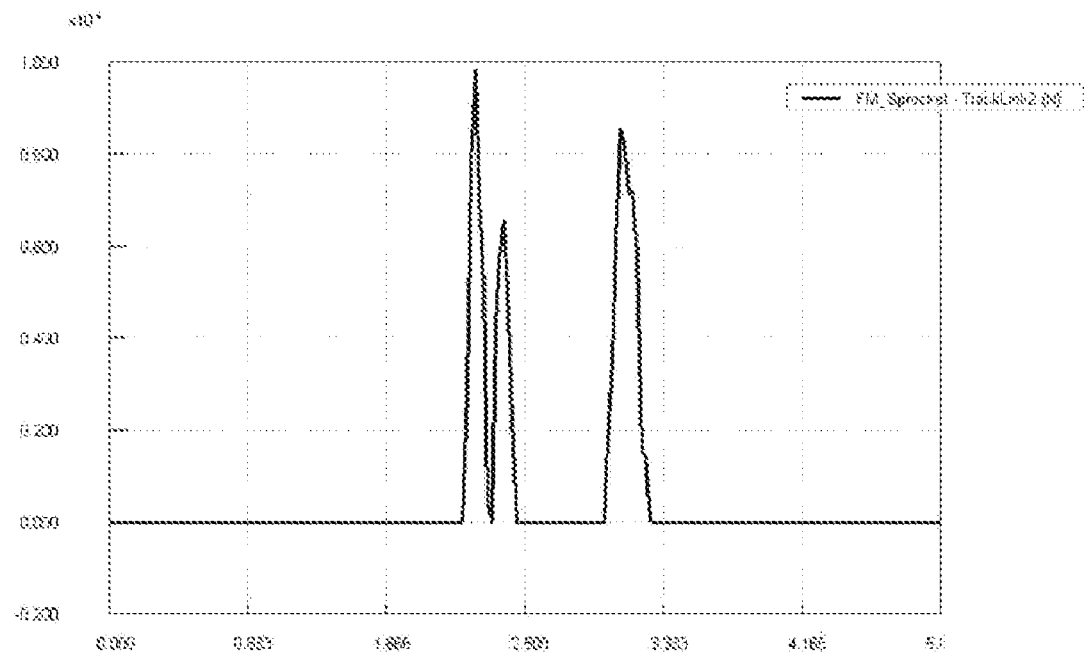
FIG. 3 is a graph showing dynamic analysis of the undercarriage of FIG. 1.
Figure 8:
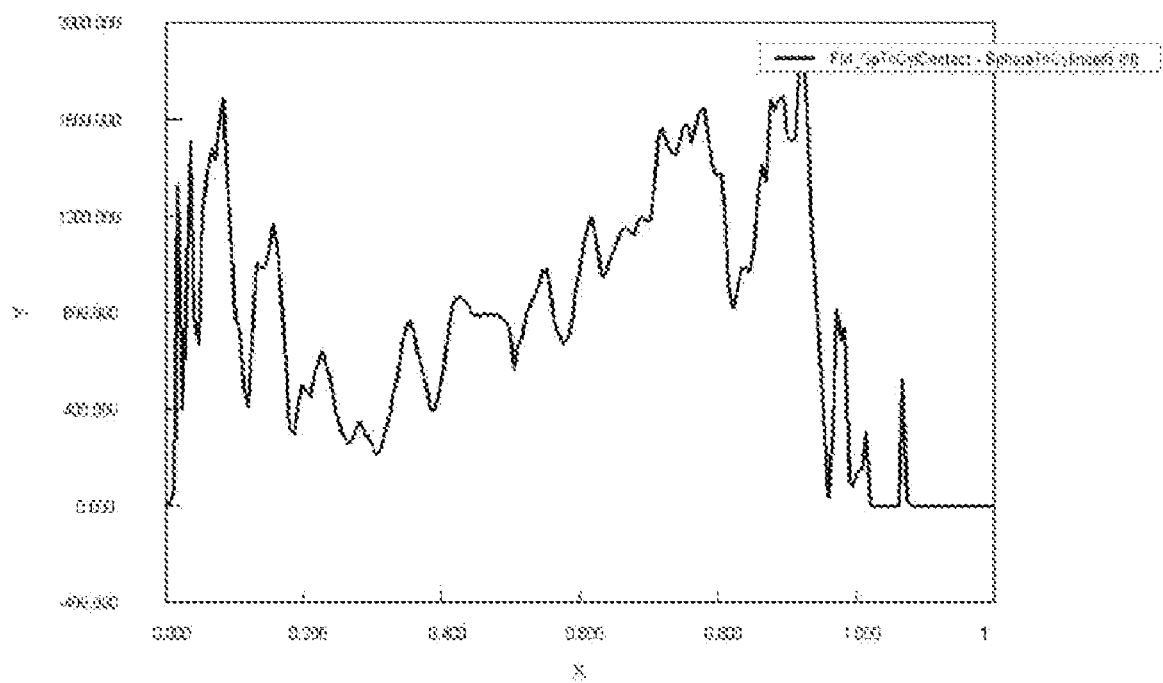
FIG. 8 is a graph showing dynamic analysis of the undercarriage according to a preferred embodiment of the present invention.

FIG. 8 is a graph showing a dynamic analysis of the undercarriage according to the preferred embodiment of the present invention. It shows the joint force that the portion at which the gear chain 70 contacts the coreless rubber crawler 10 (section B–B') receives during transportation over time analyzed by dynamic analysis software (RecurDyn™ software). The graph shows that the stress, which was concentrated in FIG. 3, is distributed almost uniformly. As a result, the load of the vehicle is distributed uniformly and thus durability improves significantly.

Figure 9:
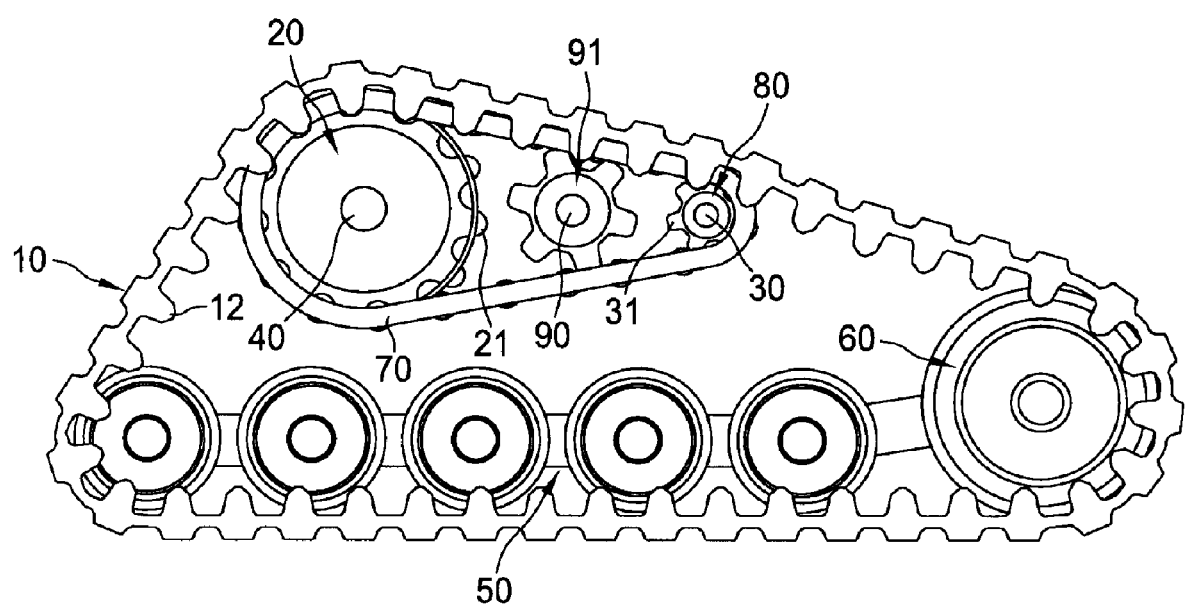
FIG. 9 is a side view of an undercarriage according to another embodiment of the present invention.

FIG. 9 is a side view of an undercarriage according to another embodiment of the present invention. A supporting axle 90 is added between the main axle 40 and the auxiliary axle 30 of the embodiment of FIG. 4, preferably at the midpoint between the main axle 40 and the auxiliary axle 30. At each end of the supporting axle 90 is a supporting sprocket 91. The supporting axle 90 and the supporting sprocket 91 prevent the gear chain 70 from sagging because of the distance between the main axle 40 and the auxiliary axle 30 and the weight of the gear chain 70, thereby preventing non-uniform contact of the gear chain 70 with the coreless rubber crawler 10.

The more supporting axles 90 and supporting sprockets 91 between the main axle 40 and the auxiliary axle 30, the farther the auxiliary axle 30 can be from the main axle 40, thereby providing a larger contact area of the gear chain 70 with the coreless rubber crawler 10 and improving stress dispersion and durability.

While the present invention has been described in detail with reference to the preferred embodiments, those skilled in the art will appreciate that various modifications and substitutions can be made thereto without departing from the spirit and scope of the present invention.

INDUSTRIAL APPLICABILITY

The present invention offers the advantage of relieving stress concentrations at a coreless rubber crawler and a sprocket when driving a heavy vehicle like a skid loader and the consequent stress accumulation by increased contact area with a gear chain, thereby reducing deformation and stress of the protruding teeth, improving durability, and extending the life span.

Also, stable and efficient power transfer between the sprocket and the coreless rubber crawler via the gear chain offers improved riding comfort.

The invention claimed is:

1. An undercarriage equipped with a coreless rubber crawler in a chain drive configuration comprising:
    a coreless rubber crawler;
    a gear chain, the outside of which is in contact with the inside of the coreless rubber crawler;
    a rotating sprocket having cogs connected to an end of a main axle, and the cogs are in contact with the inside of the gear chain;
    an idler rotated by the coreless rubber crawler; a track roller; and
    a rotatable auxiliary sprocket having cogs connected to an end of an auxiliary axle spaced a predetermined distance from the main axle, wherein the cogs are in contact with the inside of the gear chain.

2. The undercarriage of claim 1, further comprising:
    at least one supporting axle located between the main axle and the auxiliary axle; and
    at least one supporting sprocket, having cogs that mesh with the gear chain, at each end of the supporting axle.

3. The undercarriage of claim 2, whereby the supporting axle and the supporting sprocket are positioned at the midpoint between the main axle and the auxiliary axle.

4. The undercarriage of claim 1, whereby the gear ratio of the sprocket to the auxiliary sprocket is 2:1.

* * * * *